United States Patent [19]

Muerkl

[11] 4,377,250
[45] Mar. 22, 1983

[54] METHOD AND A DEVICE FOR CUTTING A PLURALITY OF LIGHT WAVEGUIDES UNITED IN A CABLE

[75] Inventor: Helmut Muerkl, Munich, Fed. Rep. of Germany

[73] Assignee: Siemens Aktiengesellschaft, Berlin & Munich, Fed. Rep. of Germany

[21] Appl. No.: 254,061

[22] Filed: Apr. 14, 1981

[30] Foreign Application Priority Data

May 9, 1980 [DE] Fed. Rep. of Germany ....... 3017873

[51] Int. Cl.³ ............................................. C03B 37/16
[52] U.S. Cl. ..................................... 225/2; 225/96.5; 225/97
[58] Field of Search ................. 225/2, 96.5, 97; 65/2, 65/112

[56] References Cited

U.S. PATENT DOCUMENTS

| | | | |
|---|---|---|---|
| 4,046,298 | 9/1977 | Schroeder, Jr. ........................ | 225/2 |
| 4,202,475 | 5/1980 | Hirai et al. ............................ | 225/2 |
| 4,315,584 | 2/1982 | Wuestner ........................ | 225/96.5 X |

OTHER PUBLICATIONS

Cutting Tool for Optical Fiber Ribbon Cable, E. C. Uberbacher, IBM Technical Disclosure Bulletin, vol. 21, No. 10, Mar. 1979.

*Primary Examiner*—Frank T. Yost
*Attorney, Agent, or Firm*—Hill, Van Santen, Steadman, Chiara & Simpson

[57] ABSTRACT

A method and apparatus for cutting each light waveguide of a plurality of light waveguides which are assembled in a cable of light waveguides characterized by an anvil positioned between a pair of common clamps for holding the waveguides parallel to each other with one clamp being biased away from the other clamp, a lifting device for lifting each of the light waveguides sequentially one after another so that the lifted waveguide carries all of the tension provided by the force acting on the moveable clamp and a notching device for simultaneously notching or scratching the lifted waveguide to cause separation of the waveguide at the notch.

13 Claims, 5 Drawing Figures

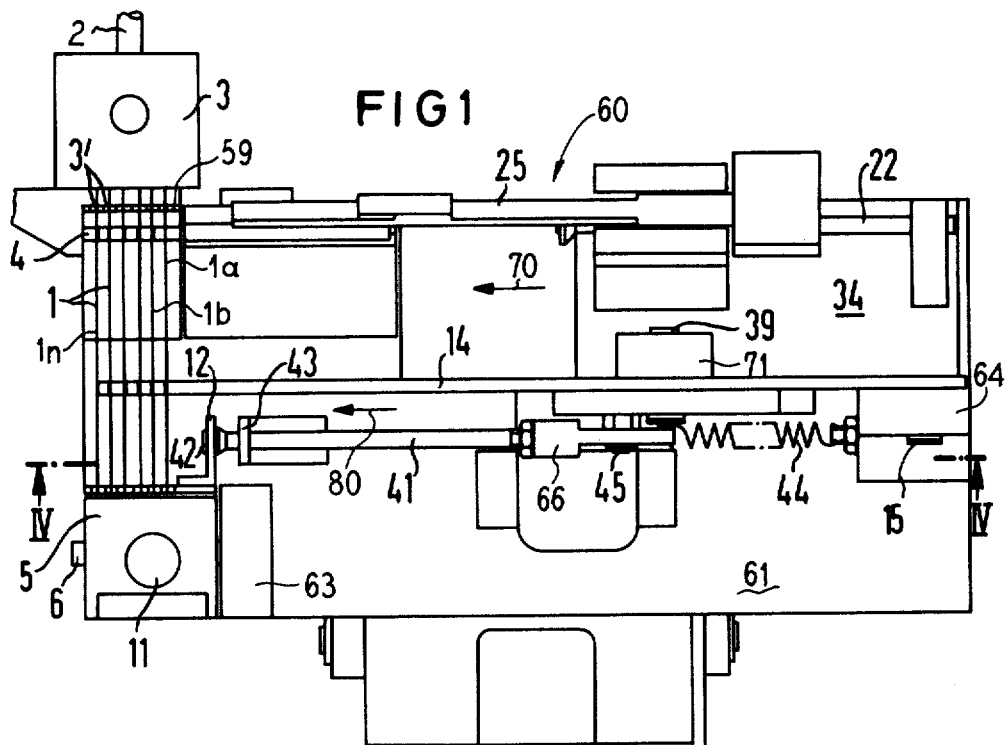
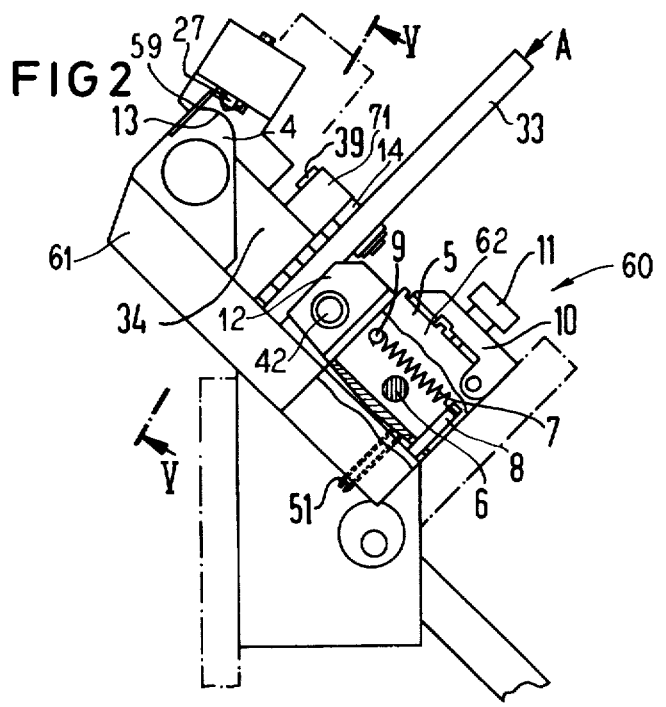

METHOD AND A DEVICE FOR CUTTING A PLURALITY OF LIGHT WAVEGUIDES UNITED IN A CABLE

BACKGROUND OF THE INVENTION

The present invention is directed to an apparatus and method of cutting a plurality of light waveguides which are united and bundled together in a cable of light waveguides. The method includes the steps of clamping each of the light waveguides at a first point, clamping each of the light waveguides at a second point spaced from the first point in a common clamp, subjecting the clamped portion of the waveguides to an axial tensile stress as the clamped portion is disposed on an anvil and subsequently scratching or notching each of the individual waveguides at a point of contact with the anvil to cause separation of the waveguides at its notch.

A method and apparatus for cutting each of the light waveguides of a plurality of light waveguides which are in a cable of light waveguides is disclosed in an earlier U.S. Patent application Ser. No. 153,195, filed May 27, 1980, now U.S. Pat. No. 4,315,584, which is based on German patent application P No. 29 25 070. In this method, the clamped waveguides were held parallel to each other as they engage an upper surface of an anvil and to obtain the desired axial tensile stress in each of the waveguides, a vertical pressure was exerted on each of the waveguides such as an optical fiber by using pressure pins or set bolts which were loaded by weights which weights were proportional to the desired axial tensile stress. However, the amount of sag in the individual light waveguides could differ as a result of the pressure load and thus there was no guarantee of a precisely defined axial tensile stress being applied on each of the individual waveguide. In fact due to the different lengths involved, different axial stresses would be applied which under certain circumstances would significantly influence the cutting or separating operation. With an increasing sag, the angle with which the individual waveguides were seated on the anvil would also increase and this increased angle would also lead to fluctuations in the axial tensile stress in the light waveguide. Also, the positioning of the set pins and weights above the anvil to apply a vertical pressure on each of the waveguides often interferred and slowed up the operation of inserting the light waveguides in the clamping devices during the initial stages of the method.

SUMMARY OF THE INVENTION

The present invention is directed to a method and apparatus which will enable a more precise setting of the axial tensile stresses being applied on the waveguides as the waveguides are being cut or separated. In addition, the device for performing the method has a much more simple design which is easier to operate and manipulate.

To accomplish these goals, the method for cutting each light waveguide of a plurality of light waveguides which are assembled in a cable of light waveguides comprises the steps of clamping each of the light waveguides at a first point, clamping each of the light waveguides as a second point spaced from the first point in a common clamp with the waveguides extending between the first and second points being parallel to each other, positioning the light waveguides extending between the first and second points over the anvil with each of the light waveguides being parallel to one another, applying a force to bias the second common clamp away from the first point, then sequentially lifting each of the light waveguides of the plurality of light waveguides so that the lifted waveguide supports the entire force to bias the common clamp and while the waveguide is being lifted, notching each of the prestressed or lifted light waveguides at a point of contact with the anvil to cause a separation of each of the waveguides at its notch.

The inventive method utilizes the fact that a specific force effective in the axial direction of the light waveguides is provided for prestressing each light waveguide and that this force is transmitted to the light waveguide by means of the successive lifting of the respective light waveguides prior to the scratching or notching step. The method requires only one force effective in one direction for the pressure loading of the individual light waveguides and requires only a very simple device for implementing the method. Thus, it is expedient to practice the method with a device comprising an anvil positioned between a pair of common clamps for holding the waveguides parallel to one another, at least one of the clamps being moveable, means for biasing the moveable clamp away from the clamp, means for successively or sequentially lifting each of the light waveguides one after the other so that the lifted waveguide carries all of the tension provided by the means for biasing the moveable clamp and means for simultaneously notching the lifted waveguide to cause separation of the waveguide at the notch. This device has the significant advantage that it is not only a precisely defined axial tensile stress which is made available for each individual waveguide but rather is also very significant effect of facilitating the manipulation of the device because the clamping devices, which are for grasping the light waveguides, are freely accessible since the pressure on the individual light waveguides occurs by means acting below the waveguides. The force influencing or biasing the moveable clamping device for example can be a weight. A spring with constant tension however is particularly advantageous as the means for biasing.

Preferably, the moveable clamping device for the insertion or the grasping of the light waveguides is brought into a specific initial position in which the axial tension is relieved. Expediently it can be held in this initial position by means of a rod with a head having a conical surface which coacts with an aperture secured to the clamping device. The rod is loosely connected to an actuating lever for the actuation of the scratching device which is moveable in a perpendicular direction with respect to the light waveguides as well as to the lever or arm for lifting the light waveguides. Thus, when the activating lever is moved, the means for holding the moveable clamp is released.

BRIEF DESCRIPTION OF THE DRAWINGS

FIG. 1 is a plan view of the device of the present invention taken from the direction A of FIG. 2;

FIG. 2 is an end view of the device of the present invention with portions broken away for purposes of illustration;

DESCRIPTION OF THE PREFERRED EMBODIMENTS

Figure 3:
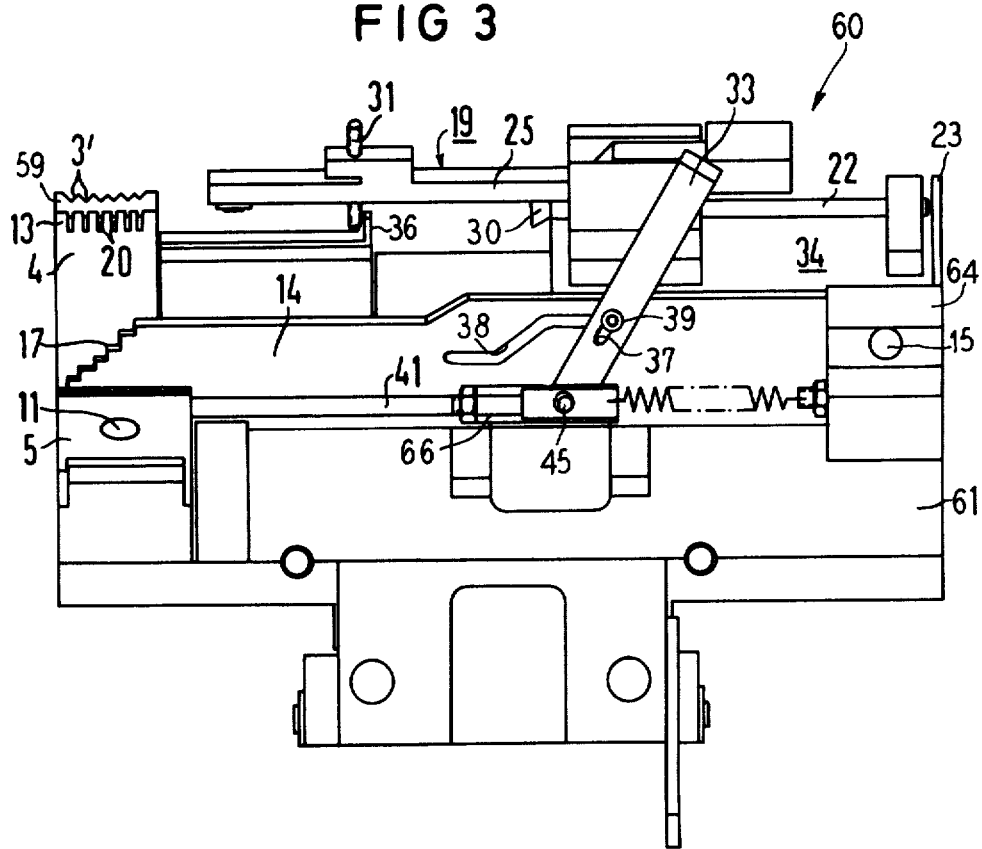
FIG. 3 is a side view of the device in accordance with the present invention.

The principles of the present invention are particularly useful when incorporated in a device generally indicated at 60 in the FIGS. for cutting optical or light waveguides such as a plurality of fibers 1 which have been bundled together and contained in a cable 2 as illustrated in FIG. 1.

The device 60 enables the productions of cable connections at the ends of the individual light waveguides such as optical fibers, which not only must lie in a common plane but also have ends which have an optically smooth surface which extends perpendicular to the longitudinal axis of the light waveguides. A so called end piece, which simultaneously forms part of the splicing device, will serve as well for fixing the individual light waveguides.

In the cutting device 60, the individual light waveguides 1 of the cable 2 are already fixed outside of the device in a so-called end piece which is held with the assistance of a clamping device 3. The ends of the light waveguides 1 which are extending from the clamping device 3 are thus passed through triangular guidance grooves 3' of a plate 59 of the clamping device 3 which plate 59 is secured on a base 61 of the clamping device 60 so that the individual waveguides 1 are precisely positioned and can extend parallel to each other. The free ends of the light waveguides 1 are then guided over an anvil 4 which is mounted on the base 61 and then received in a moveable common clamp 5. The moveable clamp 5 has a hollow member 62, which is mounted for rotation on a shaft 6 that is mounted by a member or a block 63 on the base 61. Means are provided to bias the clamp 5 in a clockwise direction on the shaft 6 as illustrated in FIG. 2 and this means is preferably formed by a spring 7 which is secured at one end to an anchor 8 mounted on the base 61 and has the other end engaging a pin 9 carried in a hollow portion of the member 62 of the moveable clamp 5. To limit the amount of rotation of the clamp 5 in the clockwise direction, the base 61 carries an adjustment screw 51. The moveable clamp 5 has a jaw 10 which is pivotably mounted on a clamping surface of the member 62 and can be pressed against the waveguides 1 when they are inserted therein by means of a screw 11. Preferably, an elastic layer is interposed between the clamping surfaces of jaw 10 and member 62 to prevent damage to the waveguides or the elastic layer can be applied on clamping surfaces of the member 62 and the jaw 10.

As illustrated in FIG. 2, the anvil 4 has a curved or cylindrical surface 13 in which a plurality of rectangular grooves 20 (see FIG. 3) are provided for receiving the light waveguides 1. A small radius is milled out on both ends of the base of the groove so that the light waveguides can be mounted without any bending.

The device 60 includes means for sequentially lifting each of the waveguides 1 which are mounted in the clamp 3 and the clamp 5. This means includes a lifting arm or lever 14, which has one end mounted for rotation about an axis formed by a pin or axle 15 which is held in a member or extension 64 of the base 61 (see FIG. 4). In a free end 16 which is opposite the axis of the rotation formed by the axle 15, the lever 14 is provided with a plurality of graduations or stepped surfaces 17 with one stepped surface allocated to each of the waveguides. In order to rotate the arm 14 from a rest position illustrated in bold lines in FIG. 4 to the raised position illustrated in chain lines, a mechanism including a hand or actuating lever 33 is provided and is mounted to rotate on an axis of an axle 18 on the base 61. The lever 33 has an oblong hole 37 (FIG. 4) which loosely receives a pin 39 which is also engaged in a guidance groove 38 of the lever 14 and is carried on a member 71 of a carriage 34 (see FIG. 2). Thus, as the hand lever 33 is rotated in the direction of the arrow 46 (FIG. 4) from a position generally indicated at I to a position indicated at II, the arm 14 will be lifted to the raised position of the chain lines. In order to achieve a uniform motion of the hand lever 33, a breaking cylinder or clamping device 40 is provided on the shaft or axle 18.

As best illustrated in FIGS. 1 and 2, the moveable clamping device 5 supports a stop member 12 which has an aperture which receives a head 42 on the end of a rod 41. The diameter of the head 42 corresponds to the diameter of the aperture in the stop 12 and has a truncated conical surfaces extending from the major diameter at the head to the diameter of the rod. The rod 41 is guided in a guide or pillow block 43 which is mounted on a surface of the base 61 and the opposite end has a block or portion 66 which is connected by spring 44 to the member 64 and supports a pin 45 which loosely connects the rod to the hand lever 33. Thus, when the hand lever 33 is rotated in the direction of the arrow 46 in accordance with FIG. 4, not only is the arm 14 rotated about its axis 15, but the rod 41 is also shifted towards the left (see arrow 80 in FIGS. 1 and 4) so that the head 42 is released from the aperture of the stop 12 to enable the spring 7 to rotate the clamp 5 in a clockwise direction until the motion is limited by the screw 51. It should be noted that the amount of rotation of the clamp 5 when it is engaged on the adjustable stop screw 51 is not sufficient to place any tension on the waveguides 1. It should also be noted that the coaction of the slot 37 of the lever 33 as well as the configuration of the slot 38 allows initial movement of the lever arm 33 to disengage the head 42 from the aperture of the stop 12 prior to lifting the arm 14.

Figure 5:
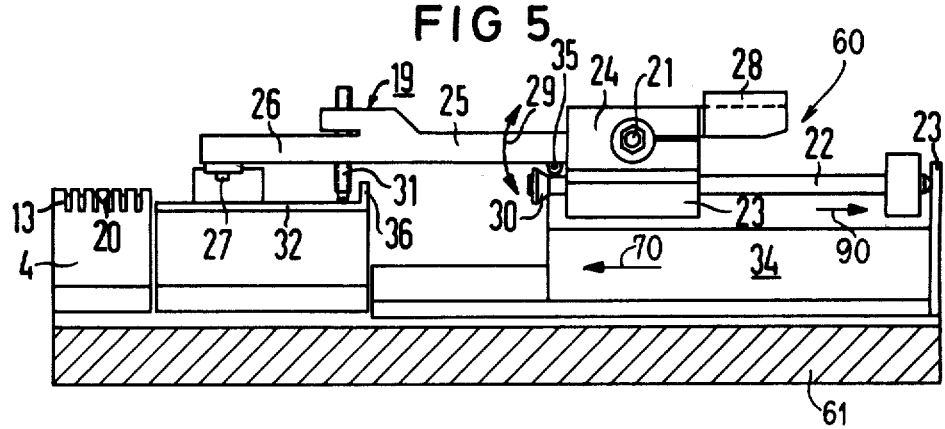
FIG. 5 is a partial cross-sectional view with portions in elevation taken along the lines V—V of FIG. 2.

The device 60 also includes a scratching or notching device or element generally indicated at 19 which is best illustrated in FIG. 5 which also shows the anvil 4 with its rectangular grooves 20 for receiving the individual light waveguides which are arranged parallel to each other between the clamps. The scratching means or device 19 is mounted on the carriage 34 which can slide along a track provided on the base 61. The carriage 34 supports or carries a pillow block 24 which receives an axle 21 mounting a double arm lever 25. One end 26 of the double arm lever 25 carries a wedge-shaped diamond 27 and the other end of the double arm lever is provided with a counter weight 28. Due to the rotational mounting of the axle 21, the lever can rotate in either direction as indicated by the arrow 29 about a fulcrum formed by the axle 21. However, the rotation of the arm 25 is limited in a counterclockwise direction by an adjustable screw or stop 31, which is positioned to interact with a fixed template 32. The template 32 will have a tooth surface on which the stop 31 will ride which tooth surface has a plurality of projections and grooves which correspond to the spacing of the grooves 20 of the anvil 4 and will prevent the diamond 27 from becoming damaged on the portion of the anvil extending between the grooves 20 as the diamond is moved sequentially across each of the fibers.

The pillow block 24 also loosely receives a rod 22 which has one end engageable with a stop 23 mounted on the base 61. On the opposite end, the rod 22 has a head 30, which can engage a stop or cam follower 35 on the double arm lever 25 and will engage a stop 36 on the template 32 when the carriage 34 has moved almost to its furthest position in the direction of arrow 70. The head 30 has a conical surface so that when it engages the stop 36, the head engages the follower 35 and rotates the arm 25 in a clockwise direction to ensure that the diamond 27 is raised above the fibers on the return stroke towards the initial position such as illustrated in FIG. 5.

In order to shift the carriage 34, the carriage has the member 71 which supports part of the pin 39 which is engaged in the grooves 38 of the lever 14 and the slot 37 of the lever 33. Thus, rotation of the lever 33 from the initial position I to the second position II (see FIG. 4) will cause the carriage 34 to be carried or shifted in the direction of the arrow 70.

The cutting device 60 functions in the following manner. While in the initial position illustrated in the figures with the lever 33 is in the position I, the lever 14 is situated in its lower position. The rod 41 will be held by the lever 33 and the spring 44 in its furthest position to the right so that the head 42 is received in the aperture of the stop 12 to hold the clamp 5 in a fixed position which enables the easy clamping of the free ends of the waveguides 1 therein.

Figure 4:
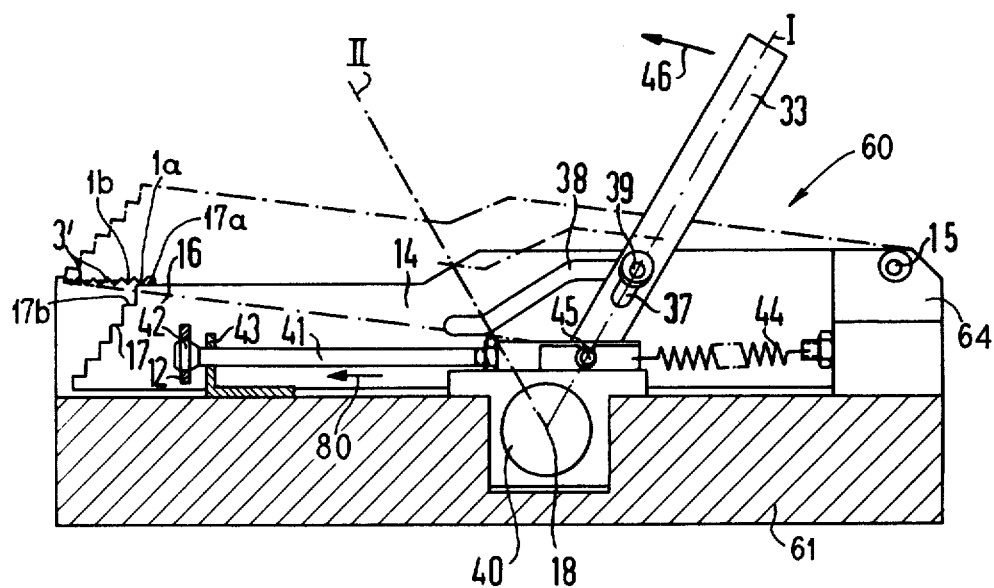
FIG. 4 is a partial cross-sectional view with portions in elevation taken along lines IV—IV of FIG. 1.

As the lever 33 is rotated in the direction of the arrow 46 of FIG. 4, the rod 41 is first moved in the direction 80 so that the head 42 releases its engagement in the aperture of the stop 12 to release the clamp 5 so that it can be rotated by the spring 7 into engagement with the adjustment screw 51 (FIG. 2). It should be noted that due to the position of the adjustment screw 51, no tension is exerted on the waveguides 1 which are clamped in the device. With continual movement of the lever 33, the first light waveguide in the sequence such as the light waveguides 1a will be engaged on an upper surface 17a of the lever 14 and will be lifted above the other waveguides so that the entire force of the spring 7 which acts on the moveable common clamp 5 will be applied to this waveguide as the clamp 5 is lifted off of the head of the adjustment screw 51. As soon as the first waveguide 1a has been lifted to such a degree that only the tensile stress of the spring 7 is applied to the waveguide 1a, the diamond 27 of the scratching device 19 will engage the waveguide 1a due to the movement of the carriage 34 in the direction 70. This engaging will cause a scratch or notch in the waveguide which under the tension applied by the spring 7 to the waveguide 1a will cause it to separate or break at the notch. Due to the separation of the waveguide 1a, the common moveable clamp 5 will now rotate in a clockwise direction towards its initial position with the amount of movement being limited by the screw 51 which will prevent the remaining light waveguides from being inadmissibly stressed due to the inertia of the clamp 5. Directly subsequent to the cutting or breaking of the first waveguide 1a, the next stepped surface 17b will engage the next waveguide 1b and raise it so that the entire force of the spring 7 will be applied thereto to place the waveguide 1b under axial tension. Immediately after the waveguide 1b is lifted, it is also scratched by the scratching device 19 and will become separated. Then this operation is repeated in sequence until the last waveguide 1n has been cut. At this time the lever arm 33 will be approaching the position II in FIG. 4 and the head 30 of the rod 22 will engage the stop 36 to shift the rod 22 in a direction 90 which is opposite to the arrow 70. With the movement of the rod 27 in the direction 90, the follower 35 will ride up on the taper surface of the head 30 and rotate the arm 26 in a clockwise direction to life the diamond 29 above the waveguides so that damage to the cut surface of the fibers will be avoided during the back stroke of the device 19.

When the lever 33 is rotated back, the double arm lever 25 is in its raised position and will move with the carriage 34 towards the initial position and the lever 14 will be lowered from its raised position back to the rest position illustrated in FIG. 4. At the end of the return stroke, the other end of the rod 22 will again hit the stop 23 so that the head 30 is moved from under the cam follower 35 to allow the double arm 25 to return to its initial position illustrated in FIG. 5.

With the inventive device, very specifically defined axial stress can be applied to each of the individual light waveguides so that all of the light waveguides are cut under completely identical conditions. This produces clean and faultless cut surfaces which are no longer in need of any special further processing. Due to the relatively simple mechanics involved in the cutting device 60, the absorption of the tensile stress by the optical fiber and the scratching of the fiber can occur simultaneously. All motions are controlled chronologically dependent upon one another due to the hand lever whose rotary motion occurs uniformly due to the rotary brake 40.

Although various minor modifications may be suggested by those versed in the art, it should be understood that I wish to embody within the scope of the patent granted hereon, all such modifications as reasonably and properly come within the scope of my contribution to the art.

I claim:

1. A method for cutting each light waveguide of a plurality of light waveguides which are assembled in a cable of light waveguides comprising the steps of clamping each of the light waveguides at a first point, clamping each of the light waveguides at a second point spaced from the first point in a common clamp, positioning the light waveguides extending between the first and second points over an anvil with each of the light waveguides being parallel to one another, applying a force to bias the common clamp away from the first point, sequentially lifting each of the light waveguides of the plurality of waveguides so that each lifted light waveguide is prestressed by supporting the entire force to bias the common clamp and while the waveguide is being lifted, notching each prestressed waveguide at a point of contact with the anvil to cause separation of each of the waveguides at its notch.

2. A device for cutting each of the light waveguides of a plurality of light waveguides which are assembled together in a cable, said device comprising an anvil positioned between a pair of common clamps for holding the waveguides parallel to each other, at least one of said clamps being moveable, means for biasing the moveable clamp away from the other clamp, means for sequentially lifting each of the light waveguides one after another so that the lifted waveguide carries all of the tension provided by the means for biasing the moveable clamp and means for simultaneously notching the lifted waveguide to cause separation of the waveguide at said notch.

3. A device according to claim 2, wherein the means for sequentially lifting each of the waveguides includes a lever arm mounted for rotation about a point and having step like engagement surfaces for sequentially engaging the waveguides.

4. A device according to claim 2, which includes means for limiting the amount of movement of the moveable clamp away from the other clamp.

5. A device according to claim 2, wherein the means for biasing comprises a spring having a constant tension.

6. A device according to claim 5, which includes means for adjusting the amount of movement of the moveable clamp caused by the spring.

7. A device according to claim 2, which includes means for holding the moveable clamp in an initial position against the means for biasing to enable engaging the light waveguides therein.

8. A device according to claim 7, wherein the means for holding the moveable clamp include a stop having an aperture mounted on said moveable clamp, a rod extending through said aperture and having a head engaged in the aperture when the clamp is held in the initial position, and means for shifting said rod between a position with the head disposed in the aperture and a position with the head removed from the aperture to enable disengaging the means for holding.

9. A device according to claim 2, wherein the means for sequentially lifting comprises a lifting arm pivotably mounted on a base of the device, said arm having stepped engagement surfaces for sequentially engaging the waveguides as the arm is rotated about its pivot point, wherein the means for simultaneously notching comprises a scratching element being moveable along the base or mounted on a carriage for movement along the base in a direction extending perpendicular to the axis of the waveguide and said device for cutting includes means for simultaneously moving the scratching element and the lifting arm.

10. A device according to claim 9, wherein the means for simultaneously moving the lifting arm and the scratching element includes a pin secured to the carriage, said pin being loosely received in a guidance groove provided on the lifting arm so that the movement of the carriage simultaneously pivots the lifting arm around its pivot point.

11. A device according to claim 10, wherein an actuating lever arm connected to the carriage receives the pin in an oblong hole forming a loose connection so that rotation of the actuating lever simultaneously moves the carriage as it rotates the lifting arm.

12. A device according to claim 10, which includes means for holding the moveable clamp include a rod shifted by the actuating lever and having a head received in an aperture of a stop attached to the moveable clamp so that as the rod is shifted to disengage the head from the aperture, said clamp is free to move.

13. A device according to claim 9, wherein the scratching element includes a pivotable arm mounted on the carriage for pivotable movement and having a scratching tool disposed on one end, means for raising the scratching tool during a return stroke of the carriage to prevent damage to the cut waveguides, said means for raising including a rod carried on the carriage and having a cam engaged by a follower on the pivotable arm of the scratching element, said rod being shifted in the carriage as the carriage approaches each end of the travel.

* * * * *